United States Patent
Pounds

(10) Patent No.: US 10,488,512 B1
(45) Date of Patent: Nov. 26, 2019

(54) LANDING GUIDANCE FOR REMOTELY OPERATED AERIAL VEHICLES USING CROSSED RADAR BEAMS

(71) Applicant: Olaeris, Inc, Fort Worth, TX (US)

(72) Inventor: Paul E. I. Pounds, Brisbane (AU)

(73) Assignee: Olaeris, Inc., Burleson, TX (US)

( * ) Notice: Subject to any disclaimer, the term of this patent is extended or adjusted under 35 U.S.C. 154(b) by 0 days.

(21) Appl. No.: 15/481,769

(22) Filed: Apr. 7, 2017

Related U.S. Application Data

(60) Provisional application No. 62/320,445, filed on Apr. 8, 2016.

(51) Int. Cl.
| | |
|---|---|
| *G01S 13/91* | (2006.01) |
| *G01S 13/87* | (2006.01) |
| *G05D 1/00* | (2006.01) |
| *G05D 1/10* | (2006.01) |
| *B64C 39/02* | (2006.01) |
| *B64D 45/04* | (2006.01) |

(52) U.S. Cl.
CPC .......... *G01S 13/913* (2013.01); *B64C 39/024* (2013.01); *B64D 45/04* (2013.01); *G01S 13/87* (2013.01); *G05D 1/0022* (2013.01); *G05D 1/101* (2013.01); *B64C 2201/027* (2013.01); *B64C 2201/108* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 5,495,248 | A * | 2/1996 | Kawase | G01S 13/876 342/191 |
| 7,233,279 | B2 * | 6/2007 | Moriya | G01S 13/18 342/134 |
| 2016/0041254 | A1 * | 2/2016 | Grandin | G01S 3/72 342/465 |
| 2017/0297737 | A1 * | 10/2017 | Arnold | G01S 19/15 |
| 2018/0157255 | A1 * | 6/2018 | Halverson | B64C 39/024 |

OTHER PUBLICATIONS

Madisetti, "Wireless, Networking, Radar, Sensor Array Processing, and Nonlinear Signal Processing", Nov. 20, 2009, CRC Press, p. I-2 to I-3 (Year: 2009).*

Kong et al., "A Ground-Based Multi-Sensor System for Autonomous Landing of a Fixed Wing UAV", 2015, Proceedings of the 2015 IEEE Conference on Robotics and Biomimetics, p. 1303-1310 (Year: 2015).*

\* cited by examiner

*Primary Examiner* — Tamara L Weber
(74) *Attorney, Agent, or Firm* — Michael B. Dodd

(57) ABSTRACT

The present invention extends to methods, systems, devices, and apparatus for landing guidance for remotely operated aerial vehicles using crossed radar beams. Radar units can be angled over a landing pad/dish for a Remotely Operated Aerial Vehicle. The Remotely Operated Aerial Vehicle lines up over radar beams by basically following radar beams to equalize the returned energy of each beam. The radar units facilitate lateral position tracking. When a Remotely Operated Aerial Vehicle is off to one side, returns for one or more beams may be stronger than returns for one or more other beans. When a Remotely Operated Aerial Vehicle is maneuvered to an appropriate position for terminal guidance, rotors can be turned off and/or thrust settled (e.g., to 90%).

20 Claims, 4 Drawing Sheets

LANDING GUIDANCE FOR REMOTELY OPERATED AERIAL VEHICLES USING CROSSED RADAR BEAMS

CROSS-REFERENCE TO RELATED APPLICATIONS

This application claims the benefit of and priority to U.S. Provisional Patent Application Ser. No. 62/320,445 entitled "Landing Guidance For Remotely Operated Aerial Vehicles Using Crossed Radar Beams", filed Apr. 8, 2016 by Paul E. I. Pounds, the entire contents of which are expressly incorporated by reference.

BACKGROUND

Background and Relevant Art

The number of remotely operated (e.g., piloted) aerial vehicles, including unmanned aerial vehicles (UAVs), being flown continues to increase. A variety of different entities including hobbyists, delivery companies, intelligence agencies, surveyors, power companies, etc. use Remotely Operated Aerial Vehicles. Some Remotely Operated Aerial Vehicles operate past line of sight. On an ongoing basis and/or at a destination, the Remotely Operated Aerial Vehicle provides images and/or video of its surroundings back to a monitoring system (which may or may not be the location of the operator). The Remotely Operated Aerial Vehicle can also perform other activities, such as, delivering a package. Hobbyists typically use UAVs within line of sight as a recreational activity. These UAVs may or may not provide images and/or video back to the operator.

In most operating environments, a Remotely Operated Aerial Vehicle can be launched from a launch location accessible to the operator (e.g., hobbyist or pilot) and/or maintenance personnel. The Remotely Operated Aerial Vehicle is flown for some amount of time or to complete a specified mission. The Remotely Operated Aerial Vehicle is then flown to a landing location (which may or may not be the same as the launch location) and lands.

Some Remotely Operated Aerial Vehicles may also operate autonomously and/or in communication with a computer system. For example, a Remotely Operated Aerial Vehicle can be programmed to follow a designated path between different sets of coordinates. In some environments, a standby pilot can monitor a Remotely Operated Aerial Vehicle during autonomous or computer controlled flight. When appropriate (e.g., due to component failures, weather conditions, etc.), the pilot can disrupt autonomous flight and assume control of the Remotely Operated Aerial Vehicle. As such, the pilot may be able to safely land a Remotely Operated Aerial Vehicle when autonomous or computer controlled flight becomes unsafe.

BRIEF SUMMARY

The present invention extends to methods, systems, devices, apparatus, and computer program products for landing guidance for remotely operated aerial vehicles using crossed radar beams. Radar returns are accessed from a plurality of radar units detecting a remotely operated aerial vehicle. For each of the accessed radar returns, a difference in the returned energy for the accessed radar return relative to each of the other accessed radar returns is calculated. It is determined that a calculated difference in returned energy between an accessed radar return for at least one of the plurality of radar units and an accessed radar return for at least one other of the plurality of radar units exceeds a specified threshold. A direction for the remotely operated aerial vehicle to maneuver to reduce the calculated difference is identified. The remotely operated aerial vehicle is instructed to maneuver in the identified direction.

After a maneuvering in a direction or upon initial detection, radar returns can (e.g., again) be accessed from the plurality of radar units detecting the remotely operated aerial vehicle. For each of the accessed radar returns, a difference in the returned energy for the accessed radar return relative to each of the other accessed radar returns is (again) calculated. It is determined that each calculated difference in returned energy is equal to or less than specified threshold (i.e., all the radar returns have essentially equalized intensity). The remotely operated aerial vehicle to is instructed to descend onto a landing structure.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

The specific features, aspects and advantages of the present invention will become better understood with regard to the following description and accompanying drawings where.

DETAILED DESCRIPTION

Figure 1A:
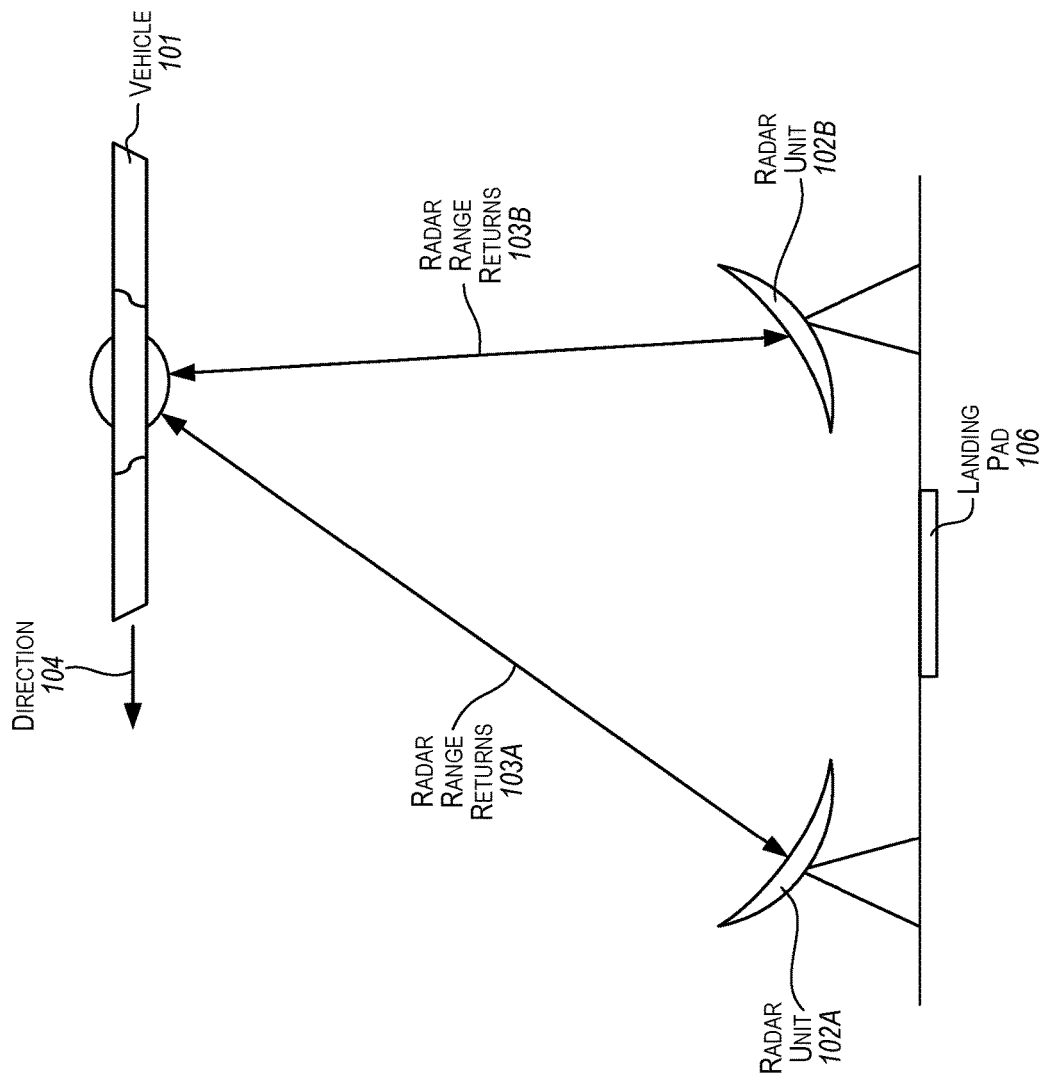
FIGS. 1A and 1B illustrate an example of aligning an aerial vehicle with a landing pad.

The present invention extends to methods, systems, devices, apparatus, and computer program products for landing guidance for remotely operated aerial vehicles using crossed radar beams. Radar returns are accessed from a plurality of radar units detecting a remotely operated aerial vehicle. For each of the accessed radar returns, a difference in the returned energy for the accessed radar return relative to each of the other accessed radar returns is calculated. It is determined that a calculated difference in returned energy between an accessed radar return for at least one of the plurality of radar units and an accessed radar return for at least one other of the plurality of radar units exceeds a specified threshold. A direction for the remotely operated aerial vehicle to maneuver to reduce the calculated difference is identified. The remotely operated aerial vehicle is instructed to maneuver in the identified direction.

After a maneuvering in a direction or upon initial detection, radar returns can (e.g., again) be accessed from the plurality of radar units detecting the remotely operated aerial vehicle. For each of the accessed radar returns, a difference in the returned energy for the accessed radar return relative to each of the other accessed radar returns is (again) calculated. It is determined that each calculated difference in returned energy is equal to or less than specified threshold (i.e., all the radar returns have essentially equalized intensity). The remotely operated aerial vehicle to is instructed to descend onto a landing structure.

Aspects of the invention can be used to provide terminal guidance to landing aerial vehicles to increase the likelihood of an aerial vehicle being appropriately aligned with a landing pad/dish prior to touch down. In some aspects, a vehicle is a Remotely Operated Aerial Vehicle, such as, a Remotely Piloted Aircraft (RPA) (and is potentially unnamed, for example, an Unmanned Aerial Vehicle (UAV)). In some aspects, a remotely operated aerial vehicle is a rotor-based UAV that includes a plurality of rotors. In some aspects, a rotor-based UAV is a quad-rotor UAV. In other aspects, a rotor-based UAV includes five or more rotors. A rotor based UAV can use rotors for one or more of: lift, maneuvering, and to change orientation.

In this description and the following claims, "radar" is defined as an object-detection system that uses radio waves to determine one or more of range, angle, or velocity of objects. Radar operates using a transmit component and receive component. The transmit component and receive component may or may not be physically located within the same radar system. A transmit component transmits radio waves or microwaves that reflect from any object in their path. A receive component receives and processes these reflected waves to determine properties of the object(s).

In this description and the following claims, a "radar unit" is defined as any combination of one or more components that implements the principles of radar. A radar unit can include hardware components (digital and/or analog) and software components for transmitting radio waves or microwaves and receiving and processing reflections from the radio waves or microwaves. A radar unit can also include hardware and/or software components for interfacing with other components at a Remotely Operated Aerial Vehicle, such as, for example, processors, system memory, communication modules (e.g., network interface cards, modems, etc.), etc. As such, a radar unit can receive input (e.g., operating commands) from and provide output (e.g., reflection information, status information, etc.) to the other components at the Remotely Operated Aerial Vehicle.

Aspects of the invention provide proximal guidance. Radar units can be angled over a landing pad/dish for a Remotely Operated Aerial Vehicle. The Remotely Operated Aerial Vehicle lines up over radar beams by basically following radar beams to equalize the returned energy of each beam. The radar units facilitate lateral position tracking. When a Remotely Operated Aerial Vehicle is off to one side, returns for one or more beams may be stronger than returns for one or more other beans. When a Remotely Operated Aerial Vehicle is maneuvered to an appropriate position for terminal guidance, rotors can be turned off and/or thrust settled (e.g., to 90%). In an appropriate position, there is essentially equalized intensity on each radar return value. A terminal guidance system implemented using cross-radar beams can work in virtually any weather conditions without having any visual control or fiducial line up. Such a terminal guidance system is relatively cheap and has few, if any, moving parts.

Figure 1B:
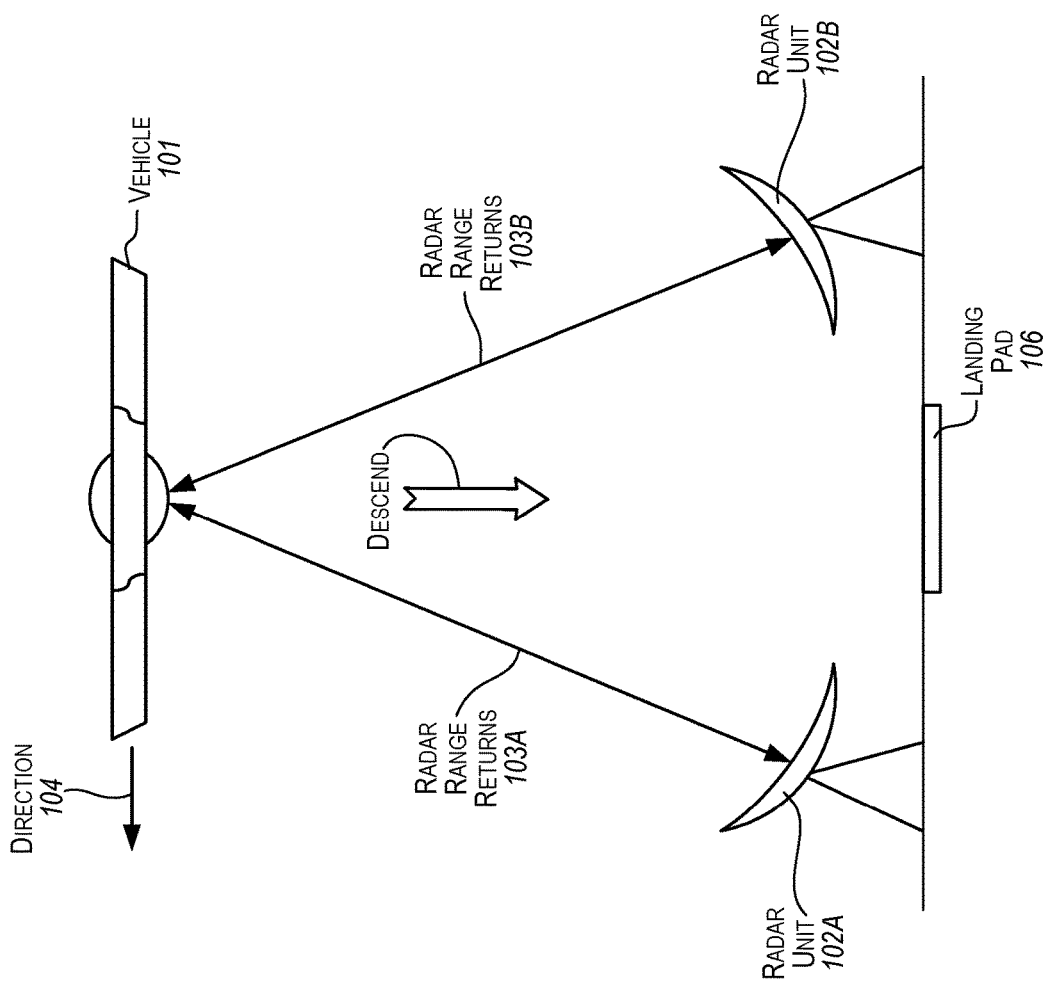

FIGS. 1A and 1B illustrate an example of aligning an aerial vehicle with a landing pad. Turing to FIG. 1A, FIG. 1A depicts aerial vehicle 101 (e.g., a rotor-based UAV flying in the air), radar units 102A and 102B, and landing pad 106. Radar units 102A and 102B can both detect aerial vehicle 101. Radar units 102A and 102B can send out beams that detect the range of aerial vehicle 101. Radar unit 102A can receive radar range returns 103A and radar unit 102B can receive radar range returns 103B. Radar range returns 103B can have somewhat higher energy than radar range returns 103A since aerial vehicle 101 is closer to radar unit 102B than radar unit 102A (i.e., 103A 103B). The difference in energy between radar range returns 103A and radar range returns 103B can be greater than a specified threshold (indicating that aerial vehicle 101 is not sufficiently aligned over landing pad 106). In response, a wireless communication system can instruct aerial vehicle 101 to move in direction 104.

Turning to FIG. 1B, aerial vehicle 101 has moved in direction 104 to change position. Radar unit 102A can again receive radar range returns 103A and radar unit 102B can again receive radar range returns 103B. Due to movement of aerial vehicle 101 in direction 104, the difference in energy between radar range returns 103A and radar range returns 103B can be less than or equal to the specified threshold (indicating that aerial vehicle 101 is sufficiently aligned over landing pad 106). In one aspect, the energy of radar range returns 103A and radar range returns 103B are essentially equal when aerial vehicle 101 is essentially equidistant from radar unit 102A and radar unit 102B. In response, a wireless communication system can instruct aerial vehicle 101 to descend onto landing pad 106.

In one aspect, the specified threshold is used to determine if a vehicle is in an appropriate position to descend. If a difference in radar returns exceeds the threshold, a vehicle is determined to be in an inappropriate position to descend and is instructed to maneuver to a more appropriate position. On the other hand, if a difference in radar returns is equal to or less than the threshold, a vehicle is determined to be in an appropriate position to descend and is instructed to descend. Radar returns being essentially equal can indicate that the difference in the radar returns is equal to or less than the threshold.

Aerial vehicle 101 can include flight control systems (e.g., one or more processors, system memory, circuitry, analog components, electronic components, digital components, ASICs, FPGAs, etc.). The flight control systems 302 can receive pilot inputs (e.g., from a ground based control station) and/or automated alignment instructions. Pilot inputs and/or automated alignment instructions can include commands for changing the orientation of aerial vehicle 101. Flight control systems can transform pilot input and/or automated alignment commands into orientation changes. Physical flight components (e.g., throttle, ailerons, rudder, elevators, rotors, etc.) can implement orientation changes to change the orientation (e.g., position) of aerial vehicle 201. Orientation changes can be implemented through manipulation of the physical flight components to change one or more of: pitch, yaw, and roll.

In one aspect, a pilot directs aerial vehicle 101 to within a specified vicinity of landing pad 106. The pilot then relinquishes control to landing pad 106 for landing in an automated manner Landing pad 106 can include one or more processors, system memory, circuitry, analog components, electronic components, digital components, ASICs, FPGAs, etc. for processing radar returns, comparing radar returns, aligning aerial vehicle 101 with landing pad 106, and instructing aerial vehicle 101 to descend onto landing pad 106.

Figure 2:
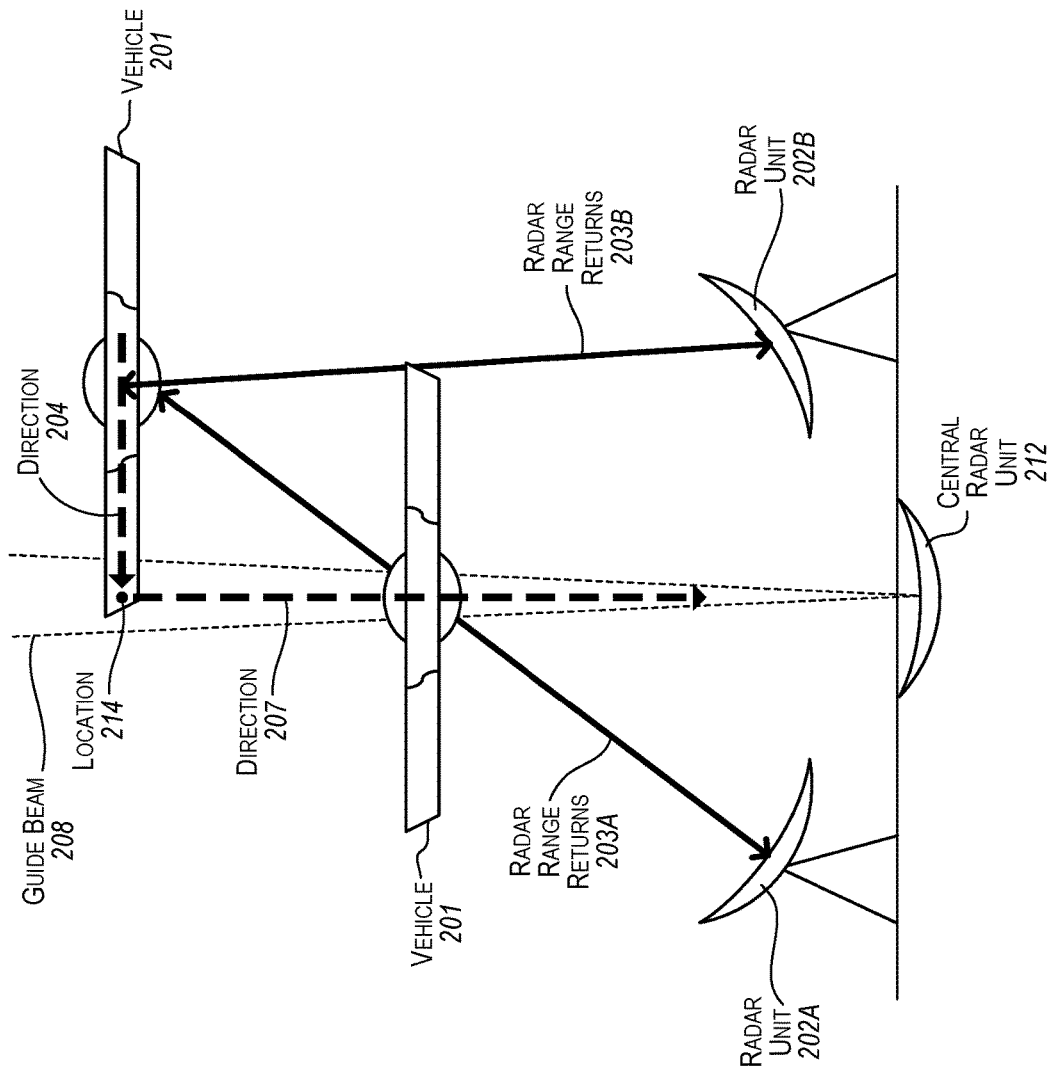
FIG. 2 illustrates an example of aligning an aerial vehicle for landing using a guide beam

FIG. 2 illustrates an example of aligning an aerial vehicle for landing using a guide beam. Turning to FIG. 2, FIG. 2 depicts aerial vehicle 201 (e.g., a rotor-based UAV flying in the air), radar units 202A and 202B, and central radar unit 212 (e.g., embedded in a landing pad). Radar units 202A and 202B can both detect aerial vehicle 201. Radar unit 202A can receive radar range returns 203A and radar unit 202B can receive radar range returns 203B. Radar range returns 203B can have somewhat higher energy than radar range returns 203A since aerial vehicle 201 is closer to radar unit 202B than radar unit 202A. In response, a wireless communication system can instruct aerial vehicle 201 to move in direction 204.

Central radar unit 212 can emit guide beam 208. Movement in direction 204 can essentially move the center aerial vehicle 201 to location 214 over guide beam 208. Once over guide beam 208, the wireless communication system can instruct aerial vehicle 201 to move in direction 207. Aerial vehicle 201 can funnel down (e.g., under full power) to a position where beams from radar units 202A and 202B intersect. Where the beams intersect, radar range returns 203A are essentially equal radar range returns 203B. When the radar returns are essentially equal, a wireless communication system can instruct vehicle 201 to turn off rotors and/or settle thrust (e.g., to 90%) in anticipation of touching down on the landing pad.

Figure 3:
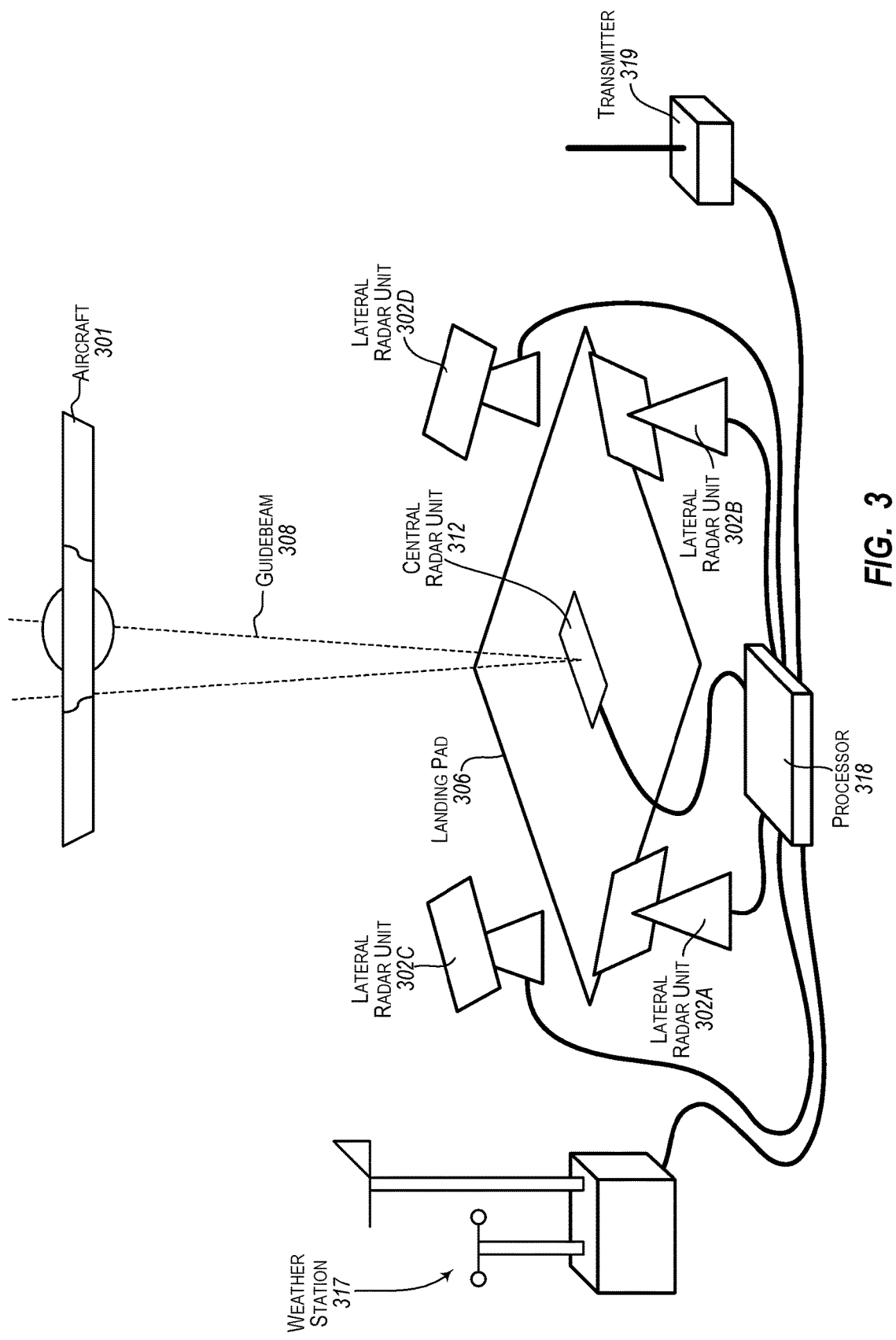
FIG. 3 illustrates another example of aligning an aerial vehicle for landing.

FIG. 3 illustrates another example of aligning an aerial vehicle for landing. Turning to FIG. 3, FIG. 3 depicts aircraft 301 (e.g., a rotor-based UAV flying in the air), lateral radar units 302A-302D, landing pad 306, central radar unit 312, weather station 317, processor 318, and transmitter 319. Processor 318 can access radar returns from each of lateral radar units 302A-302D. For example, for each of radar units 302A-302D, processor 318 can calculate a difference between returned energy for the radar unit and each of the other radar units. When a calculated difference in returned energy between two or radar units exceeds a threshold, processor 318 identifies a direction to maneuver aircraft 301 to reduce calculated differences. Processor 318 sends wireless communication from transmitter 319 to aircraft 301 to instruct aircraft 301 to implement the maneuver. In one aspect, processor 318 attempts to maneuver aircraft 301 into guide beam 308 (being transmitted by central radar unit 312).

Weather station 317 can monitor weather conditions near landing pad 306. Processor 318 can consider monitored weather conditions when identify a direction to maneuver.

Maneuvering can continue until aircraft 301 is appropriately positioned within guide beam 308 and radar return values are equalized in intensity (e.g., differences in returned energy are equal to or less than a threshold). In response, processor 318 can send wireless communication from transmitter to aircraft 301 to instruct aircraft 301 to descend onto landing pad 306 and/or turn off rotors and/or settle thrust (e.g., to 90%).

In addition to direction, a maneuver can also include changing one or more of pitch, roll, yaw, speed, acceleration, etc. Changes in pitch, roll, yaw, speed, acceleration can be implemented to compensate for weather conditions when moving in a direction.

Thus, a radar guidance system interacting with a remotely operated aerial vehicle can operate as a feedback loop where radar returns change intensity in response to movements of the a remotely operated aerial vehicle. The changes in radar return intensity can cause the radar guidance system to instruct the remotely operated aerial vehicle to make additional maneuvers for centering over a landing pad/pod prior to touch down.

In general, analog and/or digital systems can be used to monitor and control remotely operated aerial vehicles. Monitoring and control equipment can be co-located with and/or separate one another. Information exchanged between remotely operated aerial vehicles and monitoring and control equipment can be relayed over a wired and/or wireless communication networks.

Remotely operated aerial vehicles can include computer network connectivity components (e.g., a Network Interface Card ("NIC") or cellular modem) for wired or wirelessly connecting the monitoring equipment to a computer network. As such, modules, algorithms, components, etc., for providing landing guidance for remotely operated aerial vehicles using crossed radar beams can also be connected to other modules, algorithms, components, etc., over (or be part of) a network, such as, for example, a Local Area Network ("LAN"), a Wide Area Network ("WAN"), and even the Internet. Accordingly, the modules, algorithms, components, etc., for providing landing guidance for remotely operated aerial vehicles using crossed radar beams as well as any other connected computer systems and their components (e.g., in a control or command center), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Aspects of the present invention may comprise or utilize a special purpose or general-purpose computer including computer hardware, such as, for example, one or more processors and system memory, as discussed in greater detail below. Aspects within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, Aspects of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, radar returns, differences in radar returns, remotely operated aerial vehicle maneuvering instructions, weather data, thresholds, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, radar returns, differences in radar returns, remotely operated aerial vehicle maneuvering instructions, weather data, thresholds, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system, the system comprising:
    one or more hardware processors;
    system memory coupled to the one or more hardware processors, the system memory storing instructions that are executable by the one or more hardware processors;
    a plurality of radar units; and
    the one or more hardware processors executing the instructions stored in the system memory to guide a remotely operated aerial vehicle for landing, including the following:
        access radar returns from the plurality of radar units detecting the remotely operated aerial vehicle;
        for each of the accessed radar returns, calculate a difference in the returned energy for the accessed radar return relative to each of the other accessed radar returns;
        determine that a calculated difference in returned energy between an accessed radar return for at least one of the plurality of radar units and an accessed radar return for at least one other of the plurality of radar units exceeds a specified threshold;
        in response to the determination that the calculated difference in returned energy exceeds the specific threshold, identify a direction for the remotely operated aerial vehicle to maneuver to reduce the calculated difference in returned energy; and
        instruct the remotely operated aerial vehicle to maneuver in the identified direction.

2. The system of claim 1, further comprising the one or more hardware processors executing the instructions stored in the system memory to subsequent to instructing the remotely operated aerial vehicle to maneuver in the identified direction:

further access radar returns from the plurality of radar units;
for each of the further accessed radar returns, calculate a further difference in the returned energy for the further accessed radar return relative to each of the other further accessed radar returns;
determine that each further calculated difference in returned energy is equal to or less than the specified threshold; and
instruct the remotely operated aerial vehicle to descend onto a landing structure.

3. The system of claim 2, wherein the one or more hardware processors executing the instructions stored in the system memory to instruct the remotely operated aerial vehicle to descend onto a landing structure comprise the one or more hardware processors executing the instructions stored in the system memory to instruct the remotely operated aerial vehicle to follow a guide beam onto the landing structure.

4. The system of claim 2, the one or more hardware processors executing the instructions stored in the system memory to determine that each further calculated difference in returned energy is equal to or less than the specified threshold comprises the one or more hardware processors executing the instructions stored in the system memory to determining that each of the further accessed radars returns have essentially the same intensity.

5. The system of claim 2, wherein the one or more hardware processors executing the instructions stored in the system memory to instruct the remotely operated aerial vehicle to descend onto a landing structure comprises the one or more hardware processors executing the instructions stored in the system memory to send wireless communication to remotely operated aerial vehicle.

6. The system of claim 1, further comprising the one or more hardware processors executing the instructions stored in the system memory to subsequent to instructing the remotely operated aerial vehicle to maneuver in the identified direction:
further access radar returns from the plurality of radar units;
for each of the further accessed radar returns, calculate a further difference in the returned energy for the further accessed radar return relative to each of the other further accessed radar returns;
determine that a further calculated difference in returned energy between a further accessed radar return for at least one of the plurality of radar units and a further accessed radar return for at least one other of the plurality of radar units still exceeds the specified threshold;
identify a further direction for the remotely operated aerial vehicle to maneuver to reduce the further calculated difference; and
instruct the remotely operated aerial vehicle to maneuver in the further identified direction.

7. The system of claim 1, wherein the one or more hardware processors executing the instructions stored in the system memory to identify a direction for the remotely operated aerial vehicle to maneuver to reduce the calculated difference comprises the one or more hardware processors executing the instructions stored in the system memory to determine the direction based on weather conditions.

8. The system of claim 1, wherein the one or more hardware processors executing the instructions stored in the system memory to instruct the remotely operated aerial vehicle to maneuver in the identified direction comprise the one or more hardware processors executing the instructions stored in the system memory to sending wireless communication to the remotely operated aerial vehicle.

9. A system, the system comprising:
one or more hardware processors;
system memory coupled to the one or more hardware processors, the system memory storing instructions that are executable by the one or more hardware processors;
a plurality of radar units;
the one or more hardware processors executing the instructions stored in the system memory to guide a remotely operated aerial vehicle for landing, including the following:
access a plurality of radar returns from a plurality of radar units detecting the remotely operated aerial vehicle;
for each of the plurality of accessed radar returns:
calculate a difference in the returned energy for the accessed radar return relative to each of the other of the plurality of accessed radar returns;
determine that each calculated difference in returned energy is equal to or less than specified threshold; and
in response to the determination that the calculated difference in returned energy exceeds the specific threshold, instruct the remotely operated aerial vehicle to descend onto a landing structure in a manner that maintains the calculated difference in returned energy equal to or less than the specific threshold.

10. The system of claim 9, wherein the one or more hardware processors executing the instructions stored in the system memory to instruct the remotely operated aerial vehicle to descend onto a landing structure comprises the one or more hardware processors executing the instructions stored in the system memory to instruct the remotely operated aerial vehicle to follow a guide beam onto the landing structure.

11. The system of claim 9, wherein the one or more hardware processors executing the instructions stored in the system memory to determine that each calculated difference in returned energy is equal to or less than a specified threshold comprises the one or more hardware processors executing the instructions stored in the system memory to determine that each of the accessed radars returns essentially has the same intensity.

12. A processor implemented method for guiding a remotely operated aerial vehicle for landing, the method comprising:
accessing radar returns from a plurality of radar units detecting the remotely operated aerial vehicle;
for each of the accessed radar returns, calculating a difference in the returned energy for the accessed radar return relative to each of the other accessed radar returns;
determining that a calculated difference in returned energy between an accessed radar return for at least one of the plurality of radar units and an accessed radar return for at least one other of the plurality of radar units exceeds a specified threshold;
in response to determining that the calculated difference in returned energy exceeds the specific threshold, identifying a direction for the remotely operated aerial vehicle to maneuver to reduce the calculated difference in returned energy;
instructing the remotely operated aerial vehicle to maneuver in the identified direction; and maneuvering the remotely operated aerial vehicle in the identified direction.

13. The method of claim 12, further comprising subsequent to instructing the remotely operated aerial vehicle to maneuver in the identified direction:

further accessing radar returns from the plurality of radar units;

for each of the further accessed radar returns, calculating a further difference in the returned energy for the further accessed radar return relative to each of the other further accessed radar returns;

determining that each further calculated difference in returned energy is equal to or less than the specified threshold; and instructing the remotely operated aerial vehicle to descend onto a landing structure.

14. The method of claim 13, wherein instructing the remotely operated aerial vehicle to descend onto a landing structure comprises instructing the remotely operated aerial vehicle to follow a guide beam onto the landing structure.

15. The method of claim 13, determining that each further calculated difference in returned energy is equal to or less than the specified threshold comprises determining that each of the further accessed radars returns have essentially the same intensity.

16. The method of claim 13, wherein instructing the remotely operated aerial vehicle to descend onto a landing structure comprises sending wireless communication to remotely operated aerial vehicle.

17. The method of claim 12, further comprising subsequent to instructing the remotely operated aerial vehicle to maneuver in the identified direction:

further accessing radar returns from the plurality of radar units;

for each of the further accessed radar returns, calculating a further difference in the returned energy for the further accessed radar return relative to each of the other further accessed radar returns;

determining that a further calculated difference in returned energy between a further accessed radar return for at least one of the plurality of radar units and a further accessed radar return for at least one other of the plurality of radar units exceeds the specified threshold;

identifying a further direction for the remotely operated aerial vehicle to maneuver to reduce the further calculated difference; and instructing the remotely operated aerial vehicle to maneuver in the further identified direction.

18. The method of claim 12, wherein identifying a direction for the remotely operated aerial vehicle to maneuver to reduce the calculated difference comprises determining the direction based on weather conditions.

19. The method of claim 12, wherein instructing the remotely operated aerial vehicle to maneuver in the identified direction comprises sending wireless communication to the remotely operated aerial vehicle.

20. The method of claim 19, wherein sending wireless communication to the remotely operated aerial vehicle comprises sending wireless communication to a multi-rotor Unmanned Aerial Vehicle (UAV).

* * * * *